United States Patent
Ni et al.

(10) Patent No.: US 7,428,605 B2
(45) Date of Patent: Sep. 23, 2008

(54) SYMMETRIC USB DEVICE WITH METAL-TUBE PLASTIC-PLUG SHELL WITH USB PLUG CENTERED AND INTEGRATED WITH CIRCUIT BOARD SUBSTRATE

(75) Inventors: Jim Chin-Nan Ni, San Jose, CA (US); Abraham C. Ma, Fremont, CA (US); Edward W. Lee, Mountain View, CA (US); Ming-Shiang Shen, Taipei Hsien (TW)

(73) Assignee: Super Talent Electronics inc., San Jose, CA (US)

( * ) Notice: Subject to any disclaimer, the term of this patent is extended or adjusted under 35 U.S.C. 154(b) by 0 days.

(21) Appl. No.: 11/309,842

(22) Filed: Oct. 11, 2006

(65) Prior Publication Data

US 2007/0143509 A1    Jun. 21, 2007

Related U.S. Application Data

(63) Continuation-in-part of application No. 10/707,277, filed on Dec. 2, 2003, now Pat. No. 7,103,684, which is a continuation-in-part of application No. 09/478,720, filed on Jan. 6, 2000, now Pat. No. 7,257,714.

(51) Int. Cl.
*G06F 13/12* (2006.01)
*H01R 29/00* (2006.01)

(52) U.S. Cl. .............................. 710/62; 710/72; 439/43

(58) Field of Classification Search ....................... None
See application file for complete search history.

(56) References Cited

U.S. PATENT DOCUMENTS

| 5,430,859 | A | 7/1995 | Norman et al. | 711/103 |
|---|---|---|---|---|
| 6,027,375 | A * | 2/2000 | Wu | 439/607 |
| 6,044,428 | A | 3/2000 | Rayabhari | 710/305 |
| 6,148,354 | A | 11/2000 | Ban et al. | 710/301 |
| 6,438,638 | B1 | 8/2002 | Jones et al. | 710/301 |
| 6,615,404 | B1 | 9/2003 | Garfunkel et al. | 717/178 |
| 6,671,808 | B1 * | 12/2003 | Abbott et al. | 726/4 |
| 2003/0028797 | A1 * | 2/2003 | Long et al. | 713/194 |
| 2004/0073726 | A1 * | 4/2004 | Margalit et al. | 710/72 |

* cited by examiner

*Primary Examiner*—Alan Chen
(74) *Attorney, Agent, or Firm*—gPatent LLC; Stuart T. Auvinen

(57) ABSTRACT

A Universal-Serial-Bus (USB) device has a USB plug that is centered over a center-line of a circuit board. The circuit board with flash memory and a USB flash controller has metal pads that a USB connector is soldered to. The USB connector has a rear step that is about half the height of the USB connector plug. Contacts on the rear step are soldered to the metal pads on the circuit board so that the USB connector is centered around the edge of the circuit board. The overall height of the flash device can be reduced since the bulky USB connector is not attached off-center to the circuit board, but is attached at the half-height rear step. Both the USB connector and the circuit board share the same center line, allowing a printed-circuit board assembly (PCBA) to be symmetric around the center line.

28 Claims, 12 Drawing Sheets

SYMMETRIC USB DEVICE WITH METAL-TUBE PLASTIC-PLUG SHELL WITH USB PLUG CENTERED AND INTEGRATED WITH CIRCUIT BOARD SUBSTRATE

RELATED APPLICATIONS

This application is a continuation-in-part (CIP) of the application for "Electronic Data Storage Medium with Fingerprint Verification Capability", U.S. Ser. No. 09/478,720, filed Jan. 6, 2000, now U.S. Pat. No. 7,257,714.

This application is also a continuation-in-part (CIP) of the application for "Single-Chip USB Controller Reading Power-On Boot Code from Integrated Flash Memory for User Storage", U.S. Ser. No. 10/707,277, filed Dec. 2, 2003, now U.S. Pat. No. 7,103,684.

This application is further related to U.S. Pat. No. 7,095,617, filed Aug. 22, 2006, for "Portable computer peripheral apparatus with reinforced connecting ring", and U.S. Pat. No. 7,035,110, filed Oct. 1, 2004, for "Portable computer peripheral apparatus with reinforced connecting ring", and U.S. Pat. No. 6,854,984, filed Sep. 11, 2003, for "Slim USB connector with spring-engaging depressions, stabilizing dividers and wider end rails for flash-memory drive".

FIELD OF THE INVENTION

This invention relates to flash-memory-drive devices, and more particularly to devices with centered Universal-Serial-Bus (USB) connectors.

BACKGROUND OF THE INVENTION

Flash memories have gained wide acceptance for non-volatile storage, which is ideal for portable devices that may lose power, since the data is not lost when stored in the flash memory. Flash memories are constructed from electrically-erasable programmable read-only memory (EEPROM) cells. Flash EEPROM chips may store 1 G-Bytes or more of data. Small flash-memory cards have been designed that have a connector that can plug into a specialized reader, such as for compact-flash, secure-digital, memory stick, or other standardized formats.

More recently, flash memory cards are being sold that contain a USB connector. Such USB-flash memory cards do not require a specialized reader but can be plugged into a USB connector on a personal computer (PC) or other hosting device. These USB-flash memory cards can be used in place of floppy disks. A USB-flash card can have a capacity of more than ten floppy disks in an area not much larger than a large postage stamp.

Rather than use a randomly-addressable scheme such as is common with dynamic-random-access memory (DRAM), many flash memories use a block-based addressing where a command and an address are sent over the data bus and then a block of data is read or written. Since the data bus is also use to send commands and addresses, fewer pins are needed on the flash-memory chip, reducing cost. Thus flash memory is often used as a mass-storage device rather than a randomly-addressable device.

FIG. 1A shows a prior-art flash-memory card with a USB connector. Flash memory chip 12 may be a 128 Mega-byte non-volatile chip or may have some other capacity. Controller chip 14 contains a flash-memory controller that generates signals to access memory locations within flash memory chip 12. Controller chip 14 also contains a USB interface controller that serially transfers data to and from flash memory chip 12 over a USB connection.

USB connector 20 may be mounted on board 10, which is a small circuit board with chips 12, 14 mounted thereon. Multi-layer printed-circuit board (PCB) technology can be used for board 10. A plastic case (not shown) can surround board 10.

USB connector 20 contains a small connector substrate 16, which is often white ceramic, black rigid plastic, or another sturdy substrate. Connector substrate 16 has four or more metal contacts 18 formed thereon. Metal contacts 18 carry the USB signals generated or received by controller chip 14. USB signals include power, ground, and serial differential data D+, D−.

USB connector 20 contains a metal case that wraps around connector substrate 16. The metal case touches connector substrate 16 on three of the sides of connector substrate 16. The top side of connector substrate 16, holding metal contacts 18, has a large gap to the top of the metal case. On the top and bottom of this metal wrap are formed holes 15. USB connector 20 is a male connector, such as a type-A USB connector.

Unfortunately, USB connector 20 may not be centered along the axis of board 10. USB connector 20 may be mounted to the top side of board 10 as shown, causing the USB connector opening to be offset from the center of the flash device. This asymmetry is undesirable. The device may be enlarged to allow the USB plug opening to be in the center of the enlarged device, with board 10 offset within the device and USB connector 20 in the center of the enlarged device, yet enlarging the flash device is undesirable as this may increase costs and size.

FIG. 1B shows a female USB connector. Female USB connector 22 can be an integral part of a PC, or can be connected by cable 21. Another connector substrate 26 contains four metal contacts 28 that make electrical contact with the four metal contacts 18 of the male USB connector 20 of FIG. 1A. Connector substrate 26 is wrapped by a metal case, but small gaps are between the metal case and connector substrate 26 on the lower three sides.

Locking is provided by metal springs 24 in the top and bottom of the metal case. When male USB connector 20 of FIG. 1A is flipped over and inserted into Female USB connector 22 of FIG. 1B, metal springs 24 lock into holes 15 of male USB connector 20.

FIGS. 2A, 2B are cross-sections highlighting connections between male and female USB connectors. Female USB connector 22 is on the left while male USB connector 20 is being inserted from the right. Male USB connector 20 is flipped over relative to the view of FIG. 1A. Metal contacts 18 are formed on the lower surface of connector substrate 16 on male USB connector 20, while metal contacts 28 are formed on the upper surface of connector substrate 26 on Female USB connector 22. Thus the metal contacts face one another to allow for electrical contact when male USB connector 20 is inserted into Female USB connector 22 as shown in FIG. 2B.

Metal springs 24 formed on the metal case surrounding connector substrate 26 on Female USB connector 22 fit into holes on the metal case of male USB connector 20. This helps to lock the connectors together.

FIG. 3 shows a prior-art USB flash memory card using a slim USB connector. Male USB connector 20 of FIGS. 1, 2 is relatively large. The metal case in particular is cumbersome and increases manufacturing cost. Costs may be reduced by integrating male USB connector 30 with board 32. Board 32 is a PCB that has flash memory chip 12 and controller chip 14 mounted thereon. Board 32 is extended to include male USB connector 30, which has metal contacts 38 formed on end 36 of board 32.

The width and thickness of board 32 at end 36 containing male USB connector 30 is designed to approximately match that of connector substrate 16 of FIG. 1A. Plastic case 34 can enclose board 32 but have an opening for metal contacts 38. Plastic case 34 can cover the bottom and sides of male USB connector 30 up to end 36 to emulate potions of the metal case of the male USB connector of FIG. 1A.

FIGS. 4A, 4B show cross-sections of the prior-art slim USB connector being inserted into a standard Female USB connector. Board 32 that has male USB connector 30 formed on end 36 is flipped over from the view shown in FIG. 3, and end 36 is inserted into female USB connector 22 from the right side.

Metal contacts 38 are located on the lower surface of male USB connector 30. Plastic case 34 has an opening on the lower surface of male USB connector 30 to expose the metal contacts so they can make electrical connection with metal contacts 28 on the upper surface of connector substrate 26 of Female USB connector 22 when inserted as shown in FIG. 4B.

Plastic case 34 helps to fill the gap between board 32 and the top edge of the metal case of Female USB connector 22. Plastic case 34 is also formed along the thin edges of board 32 and helps to fill in the gaps between connector substrate 26 and the sides of the metal case of Female USB connector 22 that are above and below the plane of FIG. 4B.

While slim USB connector 30 can be less expensive and smaller than the standard USB connector, it fits less securely into a standard Female USB connector. The lack of the metal case removes the mechanical support provided as the male metal case that fits in the gap below connector substrate 26 and the bottom side of the metal case for the female connector.

The result is a noticeable wobble in the up and down direction when a USB flash memory card containing male USB connector 30 is inserted into Female USB connector 22. Vertical movement of 3-4 millimeter at the end of a 4-centimeter flash card can occur with slight finger pressure. This vertical play gives the user the feeling that the flash memory card is cheap and unreliable, even when sufficient electrical contact is made.

Related Patent Uses Dividers and End Rails to Aid Support

A related patent, U.S. Ser. No. 10/605,146, now U.S. Pat. No. 6,854,984, disclosed using dividers between the metal USB pads and end rails to increase support for a slim USB connector. A flash-memory card using such as supporting slim USB connector was also disclosed in the parent patent.

While useful, various improvements in the flash-memory card with the USB connector have been developed by the inventors. Manufacturing methods and products made by these methods are also being disclosed in this application.

DETAILED DESCRIPTION

The present invention relates to an improvement in flash-memory devices. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 5:
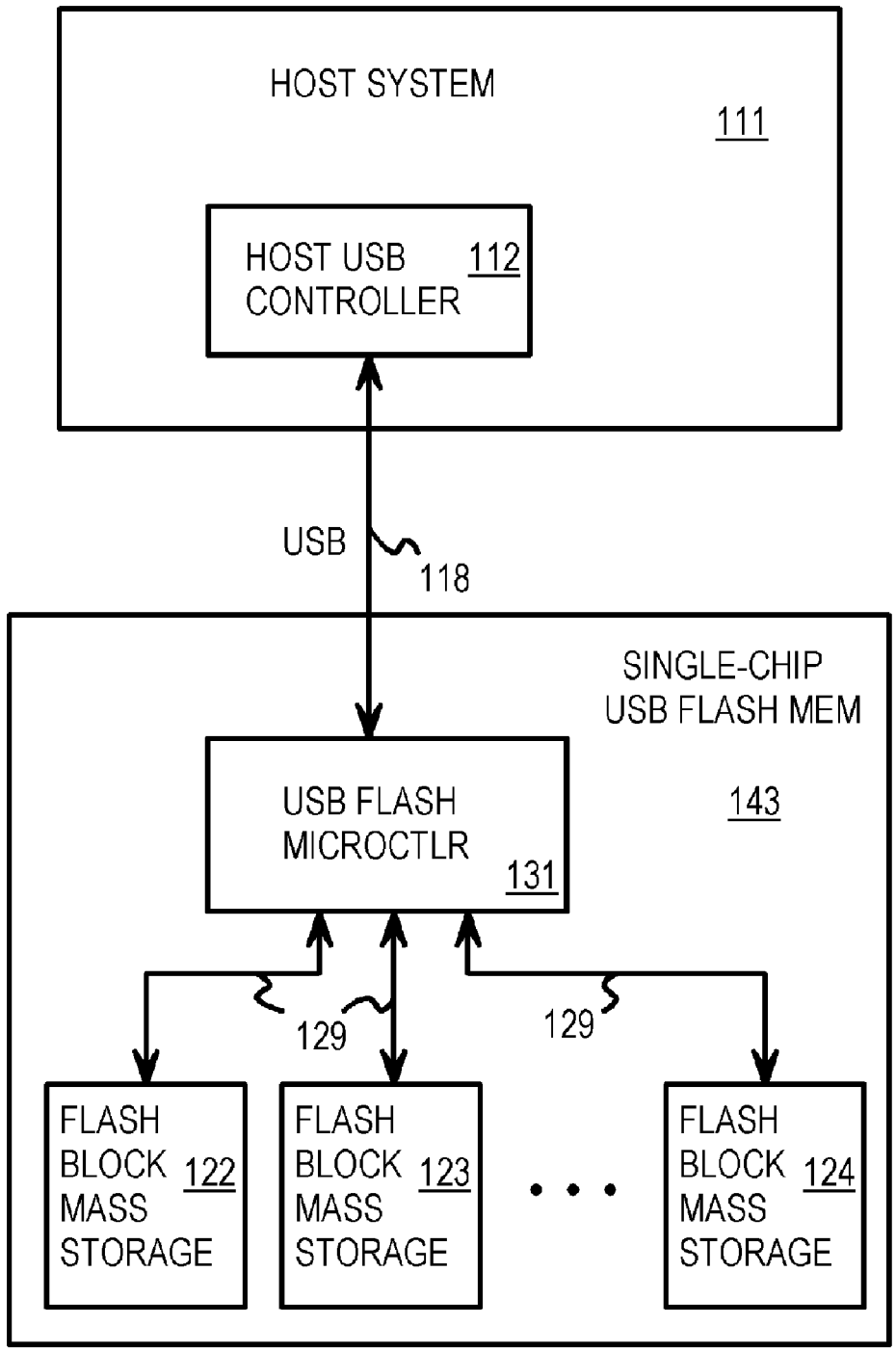
FIG. 5 is a block diagram of a flash microcontroller integrated with USB flash mass storage blocks.

FIG. 5 is a block diagram of a flash microcontroller integrated with USB flash mass storage blocks. USB host controller 112 for host 111 sends transactions over USB bus 118 to USB single-chip flash device 143. USB flash microcontroller 130 on USB single-chip flash device 143 receives and responds to transaction from host 111 over USB bus 118. USB flash microcontroller 131 has a serial interface that acts as the final USB endpoint for transactions on USB bus 118 from host 111.

USB flash microcontroller 131 also contains a flash-memory controller that sends data on internal flash buses 129 to flash mass storage blocks 122, 123, 124. Flash mass storage blocks 122, 123, 124 respond to internal requests from USB flash microcontroller 131 by transferring data over internal flash buses 129.

Since internal flash buses 129 are internal to USB single-chip flash device 143, external pins are not required for the interface to flash memory. A wider internal bus of 32, 64, or 128 bits can be used for internal flash buses 129, improving data bandwidth. However, flash mass storage blocks 122, 123, 124 are not randomly accessible. Instead, a command and an address are transferred as data over internal flash buses 129 to indicate a block of data to transfer from flash mass storage blocks 122, 123, 124. Thus flash mass storage blocks 122, 123, 124 are block-addressable mass storage rather than random-access memory (RAM).

Flash mass storage blocks 122, 123, 124 may be aggregated together by USB flash microcontroller 131, which maps and directs data transactions to selected flash storage blocks 122, 123, 124. Since USB flash microcontroller 131 performs memory management, flash storage blocks 122, 123, 124 appear as a single, contiguous memory to host 111.

Figure 6:
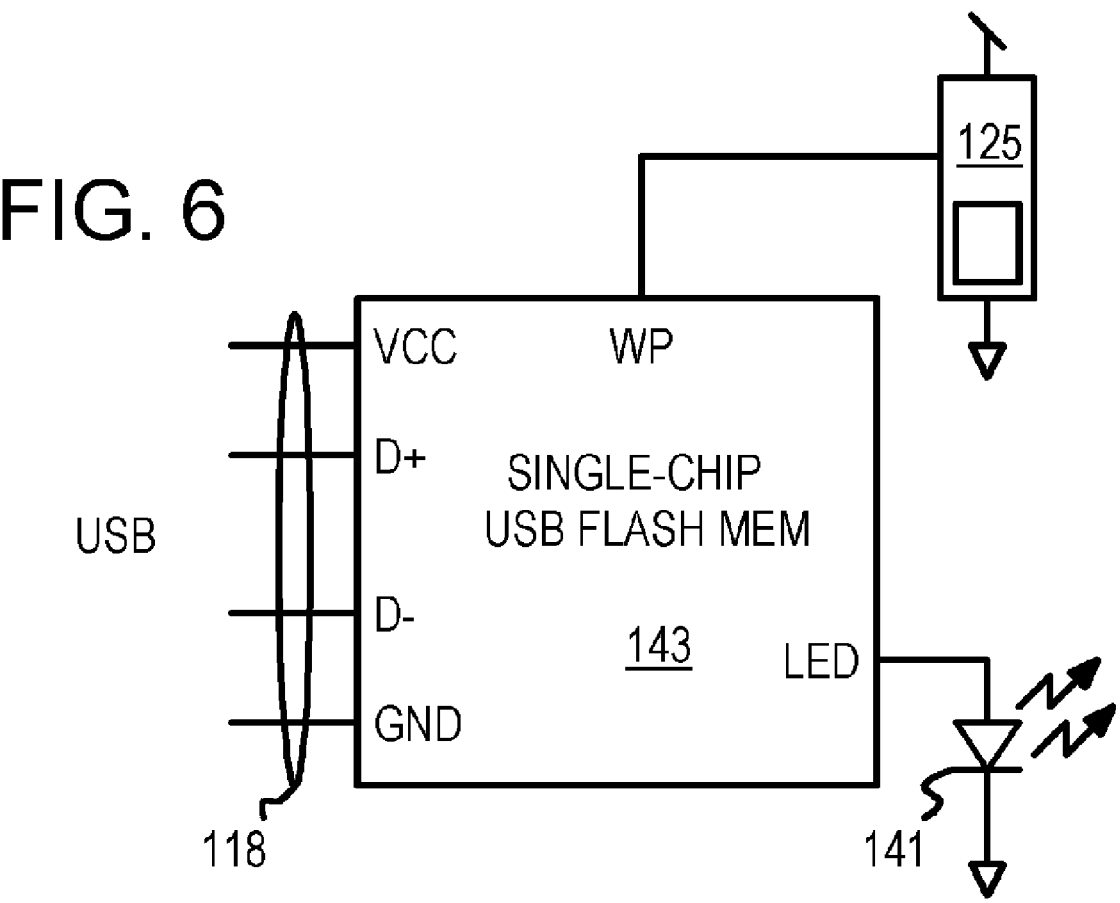
FIG. 6 shows external pin connections to a USB single-chip flash device.

FIG. 6 shows external pin connections to a USB single-chip flash device. USB single-chip flash device 143 connects to the host through USB bus 118, which has power (Vcc) and ground and differential data lines D+, D−. Data is sent over differential data lines as analog NRZI data.

A write-protect (WP) pin connects externally to switch 125. Switch 125 can be switched by the user to indicate write-protect or write-enable modes of the flash memory inside USB single-chip flash device 143.

A status output pin for a light-emitting diode (LED) can be included on some embodiments. The status-LED pin can drive LED 141 to indicate a status of USB single-chip flash device 143. For example, LED 141 can be made to blink when the internal flash memory is being written so that the user does not unplug the device before writing is completed.

Relatively few pins are needed for USB single-chip flash device 143. Since USB bus 118 is only 4 pins, including power and ground, as little as 5 pins are needed when no LED signaling is required. All commands, addresses, status, and data are carried as serial analog data over the differential data lines in USB bus 118. Additional power and ground pins, or pins for other functions could be added, but packages with fewer than 10 pins are relatively inexpensive and require little board space. Power consumption is also reduced, since fewer higher-capacitance external signals are driven by USB single-chip flash device 143.

Figure 7:
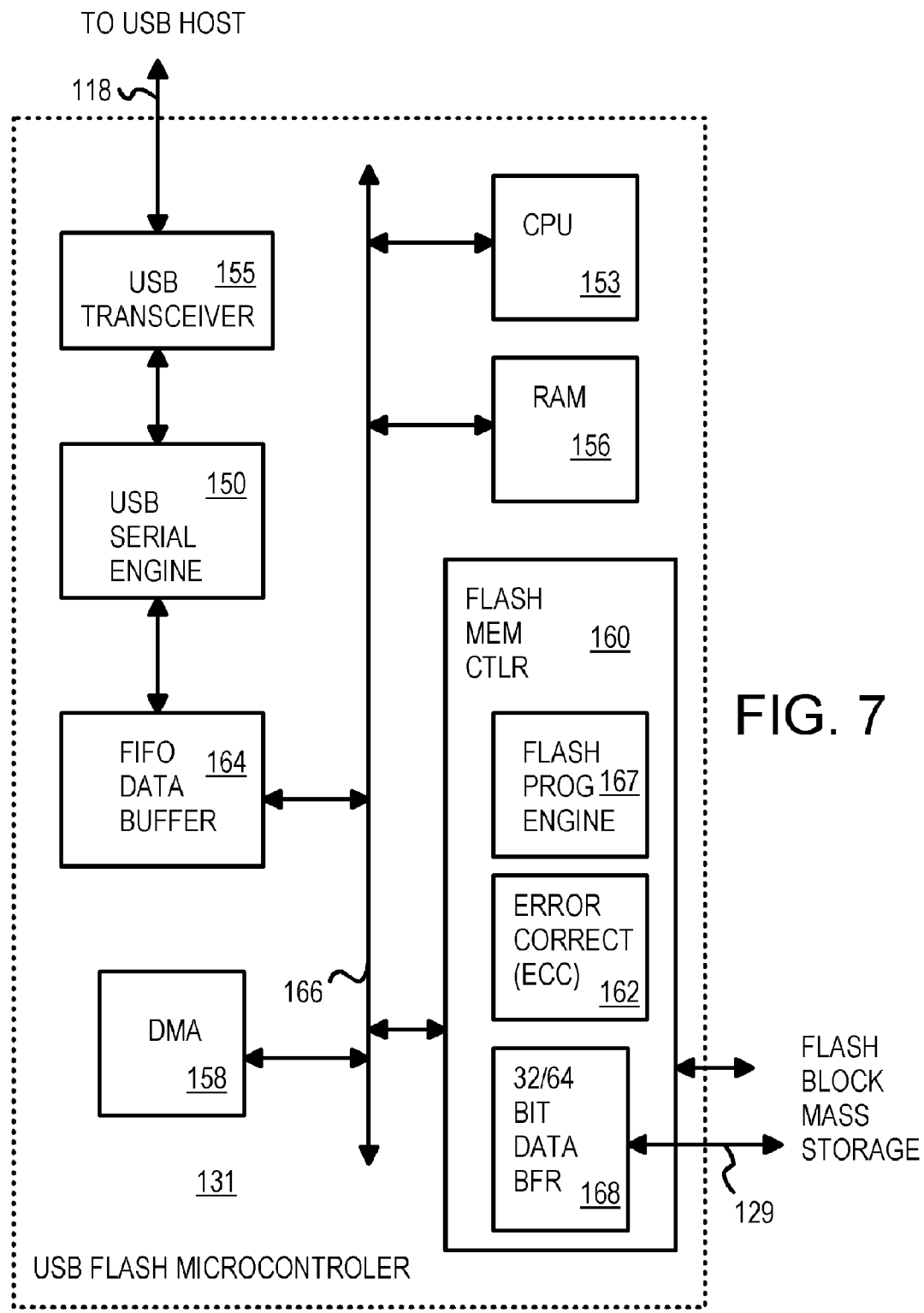
FIG. 7 is a block diagram of the USB flash microcontroller inside the USB single-chip flash device.

FIG. 7 is a block diagram of the USB flash microcontroller inside the USB single-chip flash device. Internal bus 166 connects CPU 153 with RAM 156, serial-data buffer 164, direct-memory access (DMA) engine 158, and flash-memory controller 160. CPU 153 executes instructions from RAM 156, while DMA engine 158 can be programmed to transfer data between serial-data buffer 164 and flash-memory controller 160. CPU 153 can operate on or modify the data by reading the data over bus 166. RAM 156 can store instructions for execution by the CPU and data operated on by the CPU.

Serial transceiver 155 connects to the differential data lines D+, D− of USB bus 118 and contains both a differential receiver and a differential transmitter. Data is encoded or decoded using NRZI encoding. Bit stuffing can be used to align data. An interrupt to CPU 153 can be generated when a start-of-packet sequence is detected on USB bus 118. CPU 153 can then execute a routine to handle the interrupt and process the new packet.

Serial engine 150 can perform higher-level functions such as checking cyclical-redundancy-check (CRC) checksums, locating packet identifiers, end-of-packet markers, higher-level frame markers, and converting serial data to parallel data words. The transmit and receive data is stored in serial-data buffer 164. Commands and addresses from the USB packets can also be stored in serial-data buffer 164, but is read by CPU 153 to determine what operation to perform rather than sent directly to flash-memory controller 160.

Flash-memory controller 160 includes flash data buffer 168, which contains the commands, addresses, and data sent over internal flash buses 129 to flash mass storage blocks 122, 123, 124. Data can be arranged in flash data buffer 168 to match the bus width of internal flash buses 129, such as in 132 or 64-bit words. DMA engine 158 can be programmed by CPU 153 to transfer a block of data between flash data buffer 168 and serial-data buffer 164.

Error-corrector 162 can read parity or error-correction code (ECC) from flash mass storage blocks 122, 123, 124 and perform data corrections. The parity or ECC bits for data in flash data buffer 168 that is being written to flash mass storage blocks 122, 123, 124 can be generated by error-corrector 162.

Flash programming engine 167 can be a state machine that is activated on power-up reset. Flash programming engine 167 programs DMA engine 158 with the address of the boot loader code in the first page of flash mass storage block 122 (FIG. 5), and the first address in RAM 156. Then flash programming engine 167 commands DMA engine 158 to transfer the boot loader from flash mass storage block 122 to RAM 156. CPU 153 is then brought out of reset, executing the boot loader program starting from the first address in RAM 156. The boot loader program can contain instructions to move a larger control program from flash mass storage block 122 to RAM 156. Thus USB flash microcontroller 131 is booted without an internal ROM on internal bus 166.

Figure 1A:
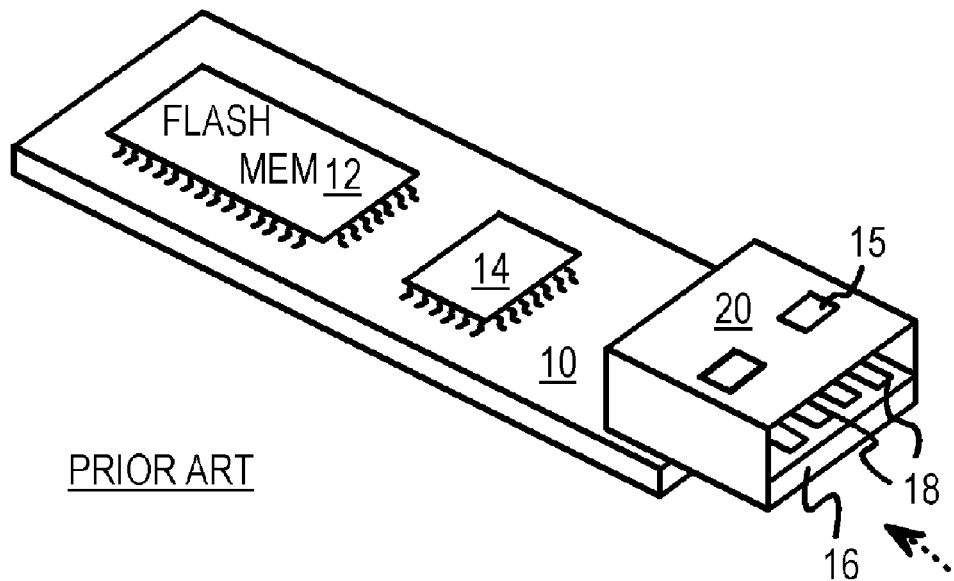
FIG. 1A shows a prior-art flash-memory card with a USB connector.
Figure 1B:
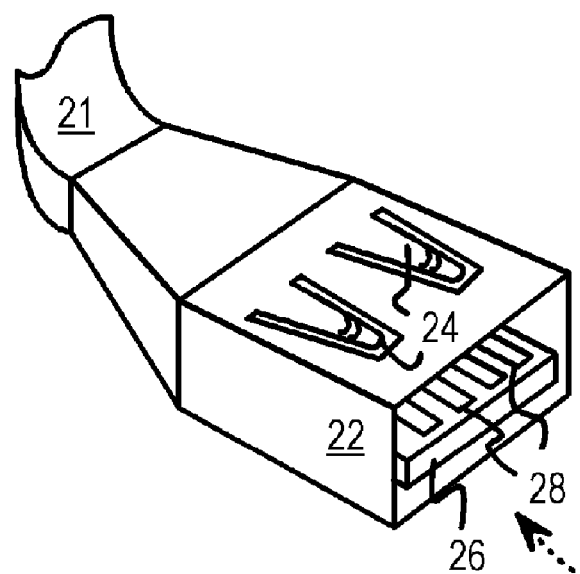
FIG. 1B shows a female USB connector.
Figure 2A:
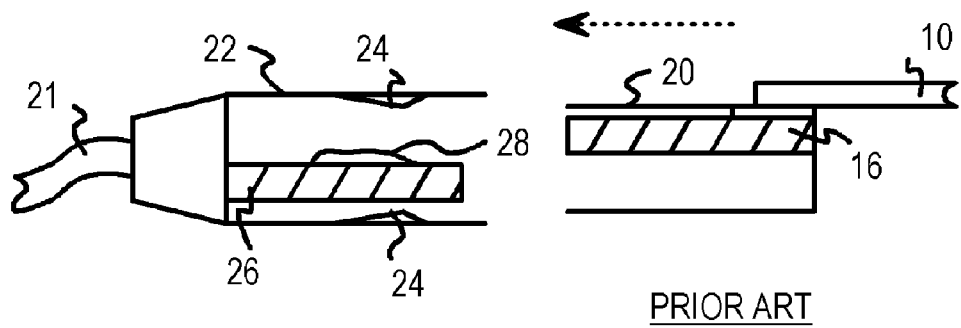
FIGS. 2A, 2B are cross-sections highlighting connections between male and female USB connectors.
Figure 2B:
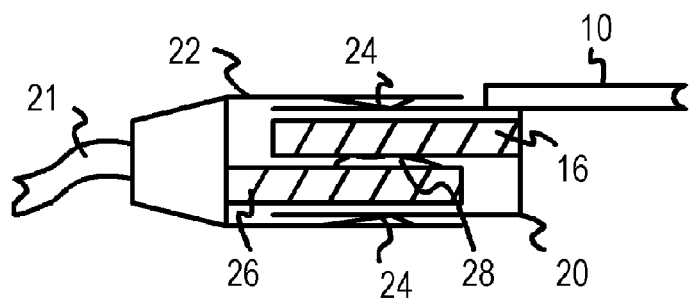
Figure 3:
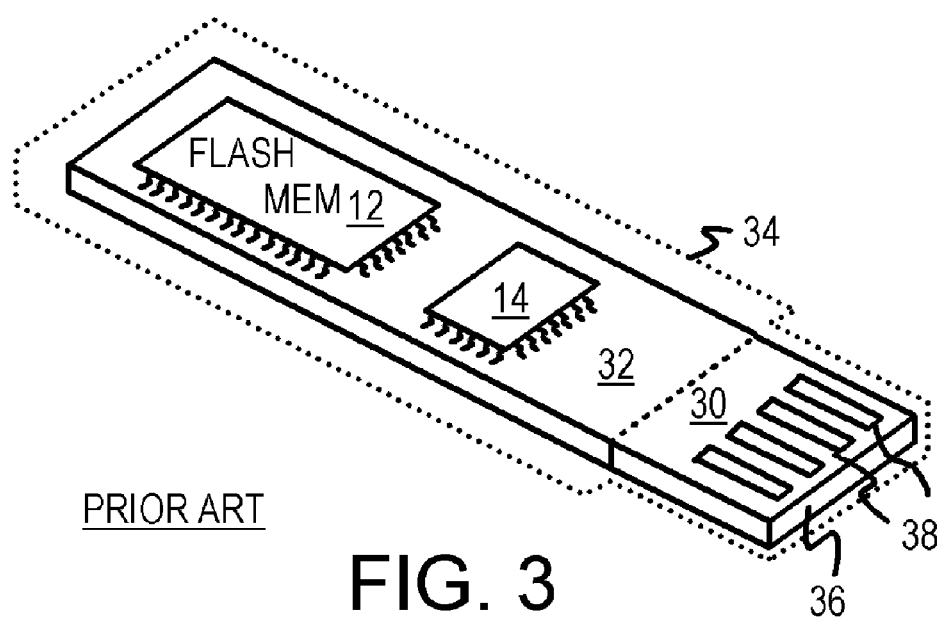
FIG. 3 shows a prior-art USB flash memory card using a slim USB connector.
Figure 4A:
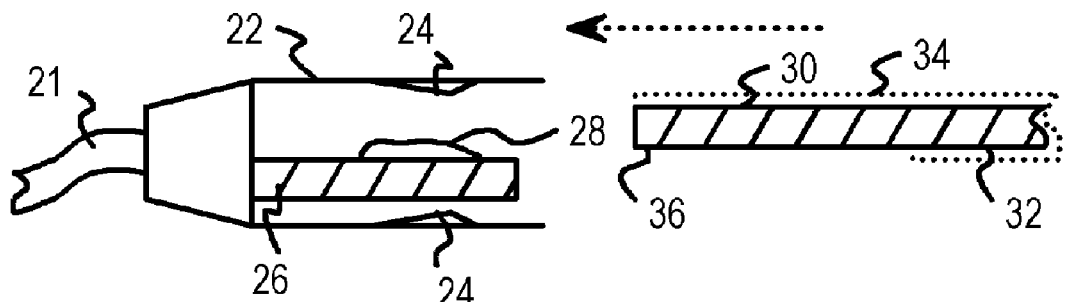
FIGS. 4A, 4B show cross-sections of the prior-art slim USB connector being inserted into a standard Female USB connector.
Figure 4B:
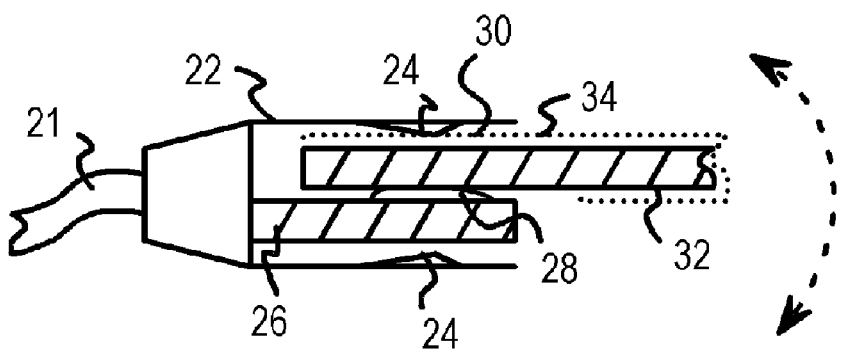

The inventors have realized that USB plugs for small, portable USB-flash devices often cause the USB device to wobble when plugged in, as shown in FIG. 4B. This wobble is undesirable, since the users view the loose connection as unreliable. This wobble can cause users to consider the USB device to be "cheap", even when expensive, high-quality integrated circuits are used within the USB device.

The inventors realize that this wobble is sometimes occurs when the USB plug substrate is formed as an extension of a circuit board that has the flash memory soldered to it. This circuit board may be thin to reduce costs, rather than thick and rigid. The flexibility of the circuit board can lead to a wobbly plug connection since the USB plug is partially formed from this flexible circuit board. To reduce this wobble, the inventors desire to have a USB connector that is soldered to the circuit board, rather than integrated with the circuit board.

The USB connector that is soldered to the circuit board can be strong and rigid, with a surrounding metal wrap around the exterior of the USB plug that reduces wobble and improves rigidity.

Figure 8:
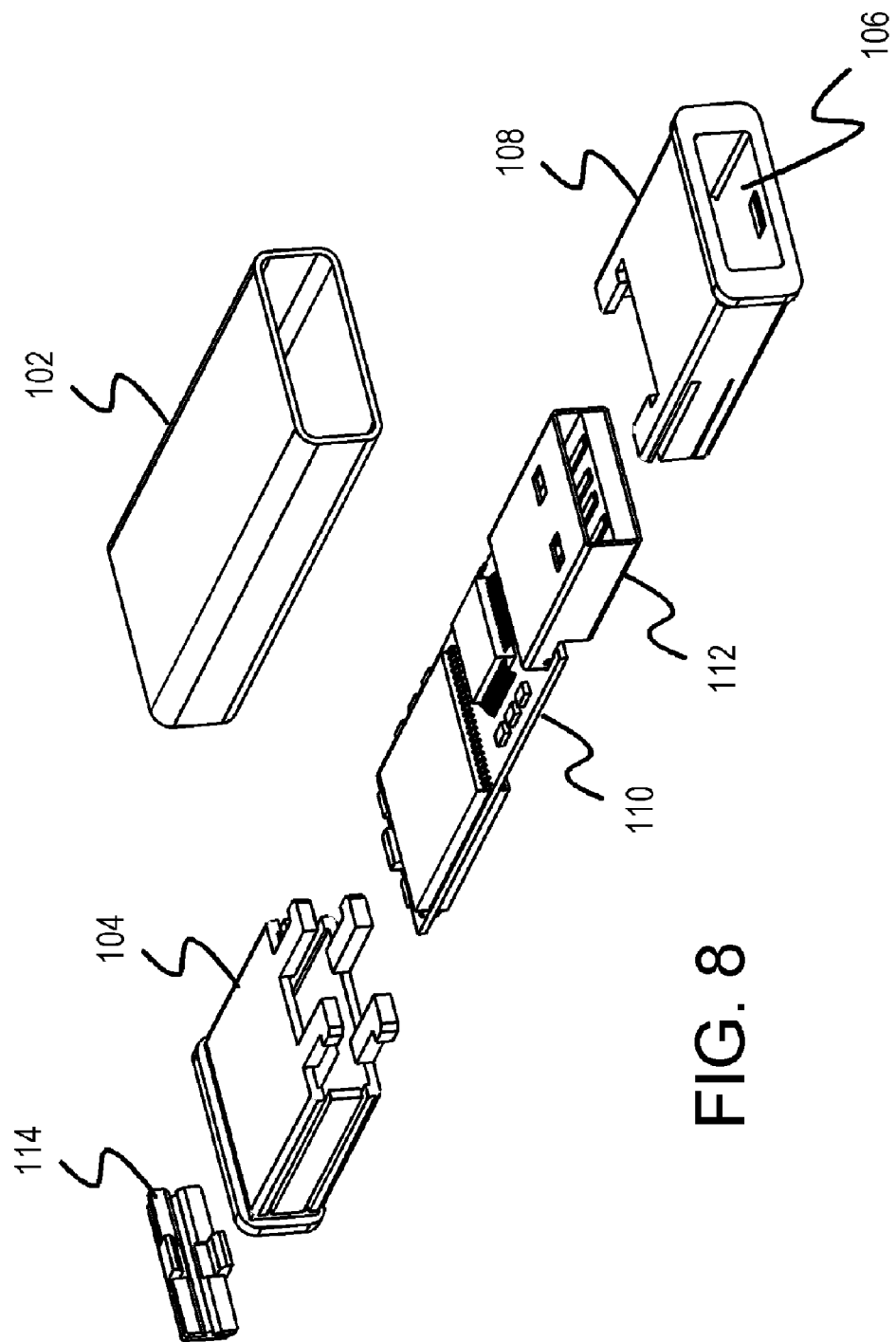
FIG. 8 shows parts, including a USB-plug assembly, that are assembled together to produce a symmetric flash-memory device.

FIG. 8 shows parts, including a USB-plug assembly, that are assembled together to produce a symmetric flash-memory device. A printed-circuit board assembly (PCBA) includes a circuit board with USB connector 112 soldered to the circuit board. PCB assembly 110 includes flash-memory chips and a USB flash-memory controller such as USB flash microcontroller 131 of FIG. 7. USB connector 112 has a metal wrap around a USB substrate that holds the four metal USB contacts. USB connector 112 is soldered to the circuit board to create PCB assembly 110.

USB connector 112 has mounting pads that are disposed on a back step near the middle of the thickness of USB connector 112. The back step allows USB connector 112 to be soldered over the center-line of the circuit board, producing a symmetric PCB assembly 110 as detailed later in FIG. 12.

During assembly, PCB assembly 110 is inserted into front housing 108 so that USB connector 112 fits through front opening 106 of front housing 108. Metal tube 102 is then slid over the outside of PCB assembly 110 and front housing 108. Metal tube 102 fits snugly over front housing 108 and is prevented from sliding too far forward by a lip around the front of front housing 108, or by other tabs or stops. Rear housing 104 is then inserted into the open end of metal tube 102 and pushed inward through the interior of metal tube 102 until locking fingers on rear housing 104 are snap-coupled into receiving fingers on front housing 108.

Light pipe 114 may be mounted to the back of rear housing 104, either before or after rear housing 104 is inserted into metal tube 102. Tabs on light pipe 114 fit into groves or slots on the back of rear housing 104 to snap light pipe 114 into rear housing 104.

Figure 9:
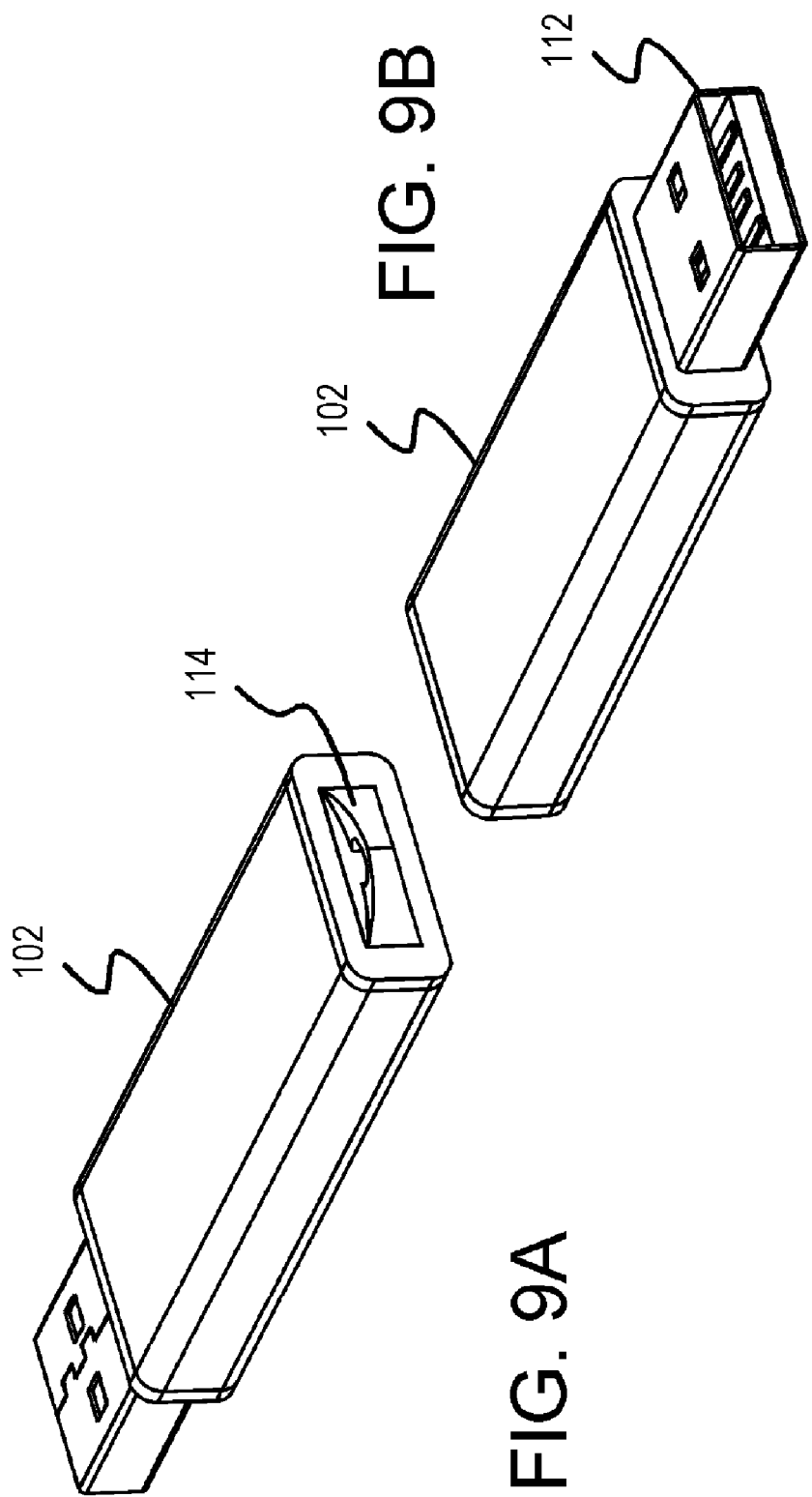
FIGS. 9A-B show the assembled flash device with the centered USB connector plug.

FIGS. 9A-B show the assembled flash device with the centered USB connector plug. FIG. 9A shows the rear view, with light pipe 114 visible on the back of the rear housing that was inserted into metal tube 102. Light pipe 114 allows an indicator light such as an light-emitting diode (LED) mounted on the circuit board of PCB assembly 110 to be visible to the user.

Figure 12:
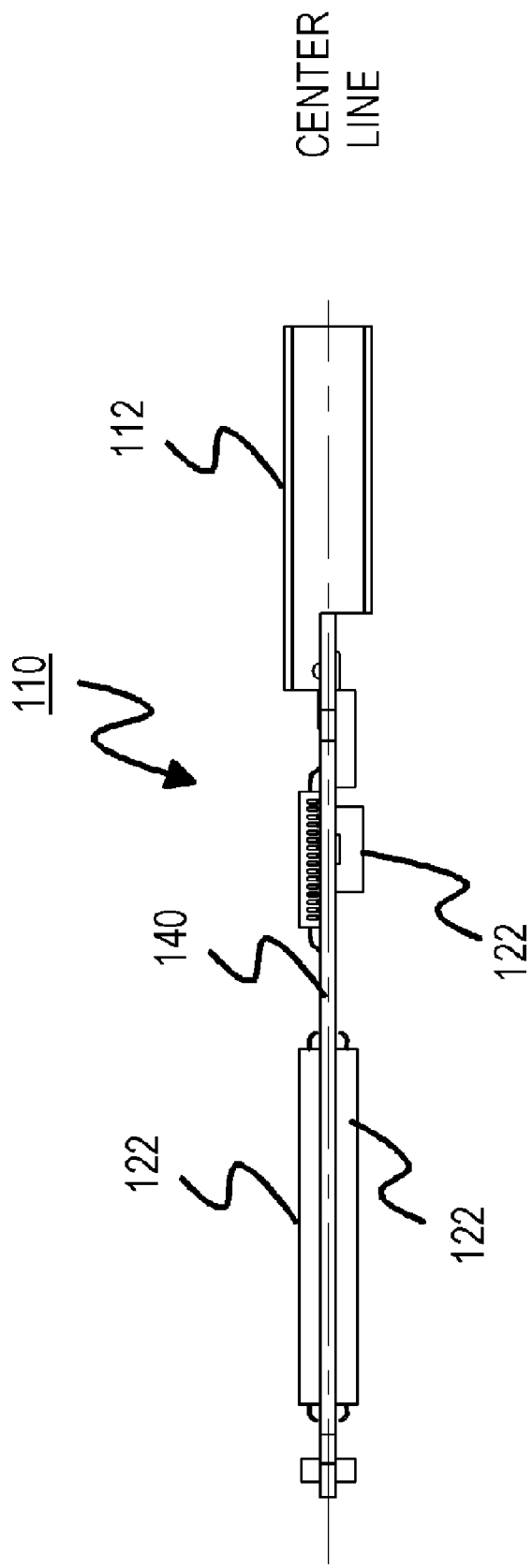
FIG. 12 shows that the USB connector is centered over the center-line of the circuit board.

FIG. 9B shows the front view. USB connector 112 protrudes through the front opening of the front housing, which is mostly covered by metal tube 102. The overall device may be thinner than other similar devices since USB connector 112 is centered over the circuit board of PCB assembly 110, rather than being offset from the center. The thickness of metal tube 102 does not have to be increased to center USB connector 112 with a non-centered PCB assembly 110, since both USB connector 112 and the circuit board of PCB assembly 110 share the same center line, as shown in FIG. 12.

Figure 10:
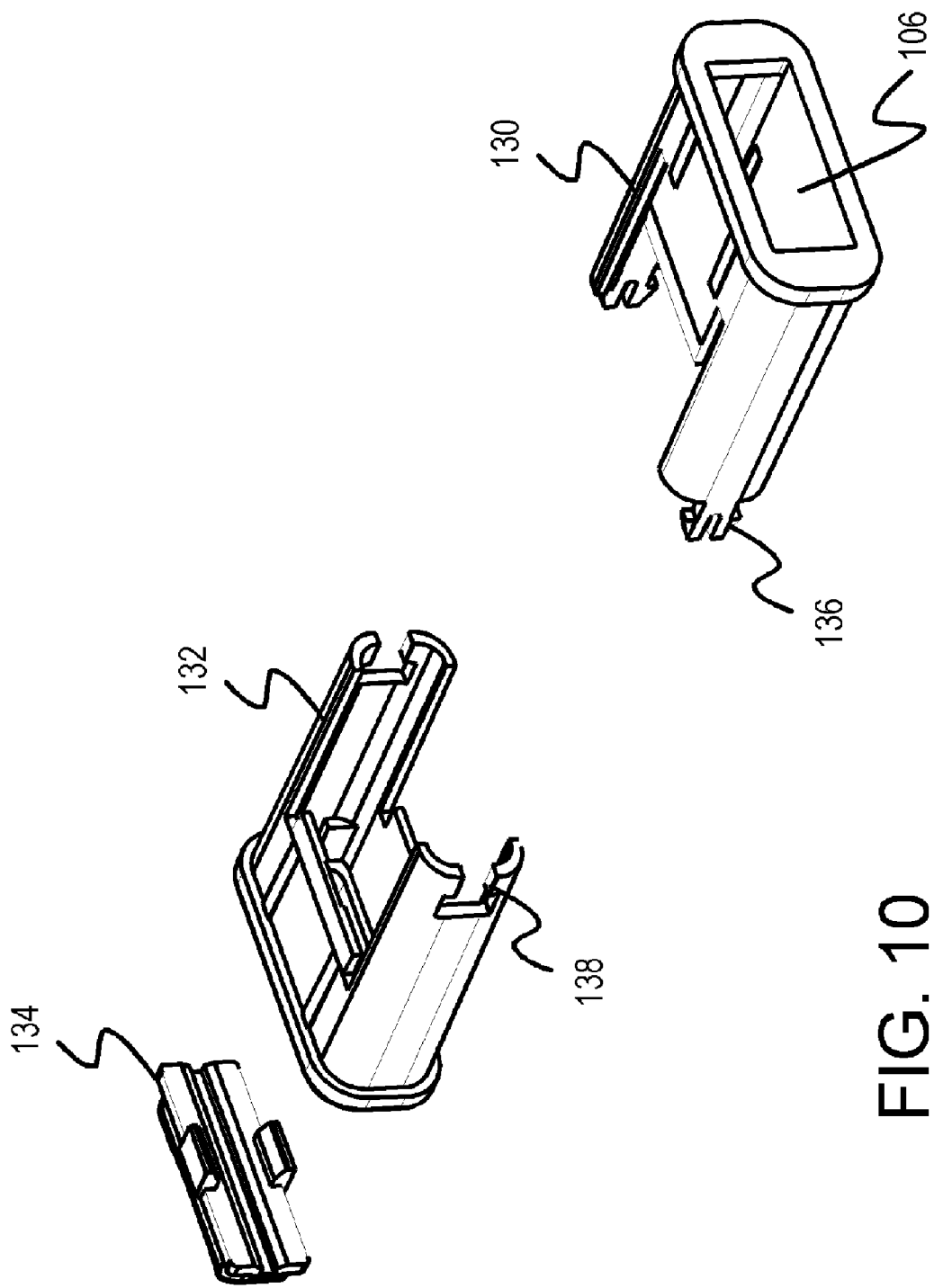
FIG. 10 shows an alternate design of the front and rear housings.

FIG. 10 shows an alternate design of the front and rear housings. Front housing 130, rear housing 132, and light pipe 134 may replace front housing 108, rear housing 104, and light pipe 114, respectively, of FIG. 8. Light pipe 134 snaps into the back of rear housing 132.

The locking fingers on the top and bottom of front housing 108 and rear housing 104 (FIG. 8) are replaced with side locks 136 on front housing 130, which engage side slots 138 of rear housing 132. Having the locks on the sides rather than the top and bottom may allow for an even thinner flash device. Metal tube 102 may be reduced somewhat in thickness using this alternative.

Figure 11:
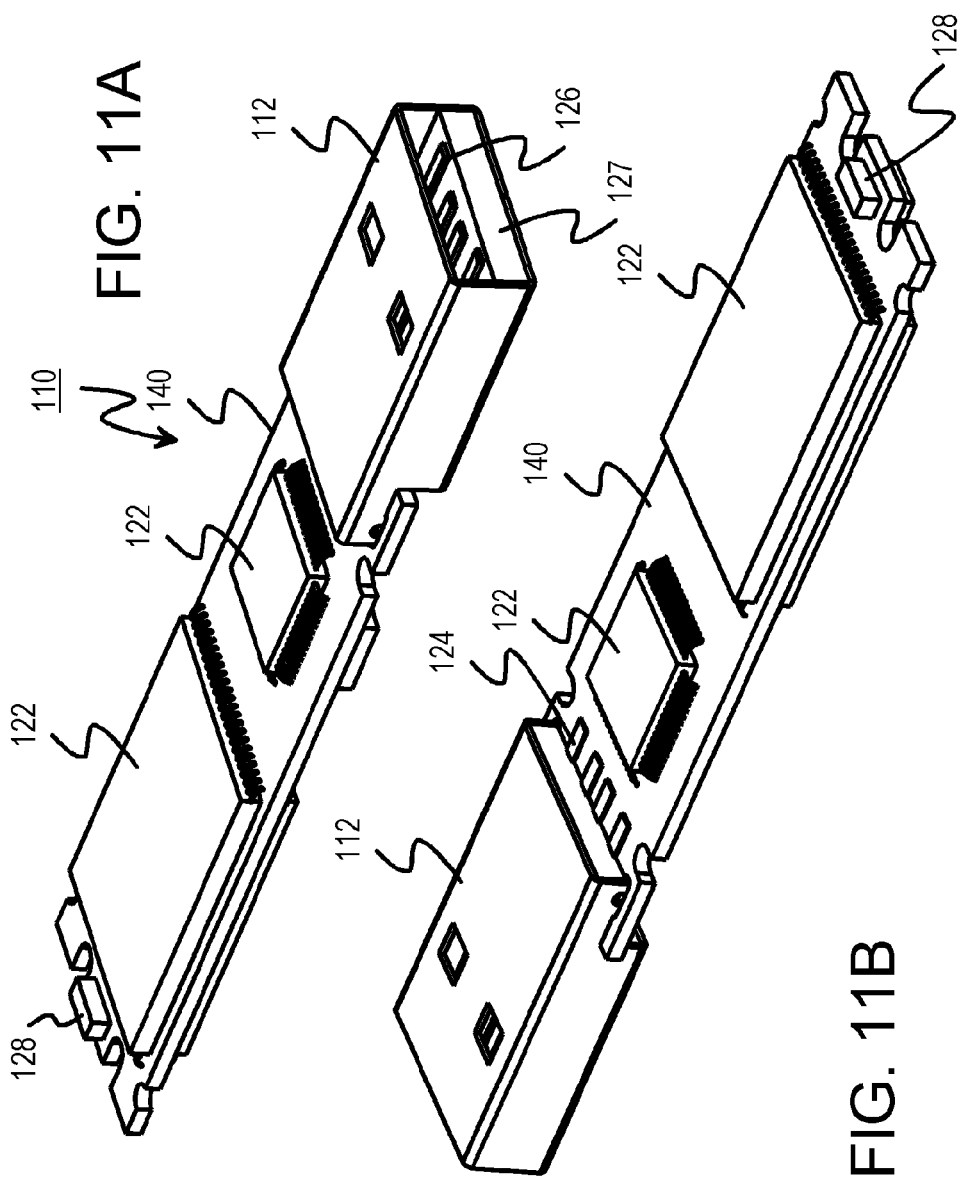
FIGS. 11A-B show the PCB assembly with the USB connector 112 centered to the circuit board.

FIGS. 11A-B show the PCB assembly with the USB connector 112 centered to the circuit board. FIG. 11A is a front view, while FIG. 11B is a back view. In FIG. 11A, four USB contacts 126 are visible inside USB connector 112, on USB substrate 127.

Chips 122 may be mounted to both sides of board 140. Chips 122 may include a pair of flash-memory chips mounted to both sides of board 140, and a flash-controller chip mounted to one side of board 140. Other components may also be mounted to board 140, such as LED 128.

Chips 122 may be packaged in Ball-Grid-Array (BGA), Thin-Outline Small Package (TSOP), or other surface-mounted packages. Other chips may also be mounted to board 140. Passive components such as capacitors and resistors may also be mounted to board 140. Board 140 can be a PCB with one or more layers of printed wiring traces.

FIG. 11B shows that USB connector 112 is soldered to metal pads 124 on board 140. Either a lead or a lead-free surface-mount technology (SMT) process may be used. USB plug substrate 127 for a lead SMT process can be glass-filled polybutylene terephthalate (PBT). USB plug substrate 127 for a lead-free SMT process must be able to withstand a higher temperature of around 240° C. USB plug substrate 127 can be made from a high-temperature thermoplastic material, such as DuPont Zenite LCP (Liquid Crystal Polymer), etc. for the lead-free process.

FIG. 12 shows that the USB connector is centered over the center-line of the circuit board. The flash device is symmetric around centerline of board 140, Chips 122 are mounted to both sides of board 140, causing PCB assembly 110 to be symmetric, except for USB connector 112.

USB connector 112 has a back step that is use for mounting to board 140. This back step may be formed from the metal wrap around USB connector 112. The back step is about half the thickness or height of USB connector 112, thus allowing USB connector 112 to be centered around board 140 when soldered to pads on board 140.

The center line of the overall PCB assembly 110 is still centered around the center line of board 140, despite the bulk of USB connector 112. Thus a symmetric flash device can be constructed.

Figure 13A:
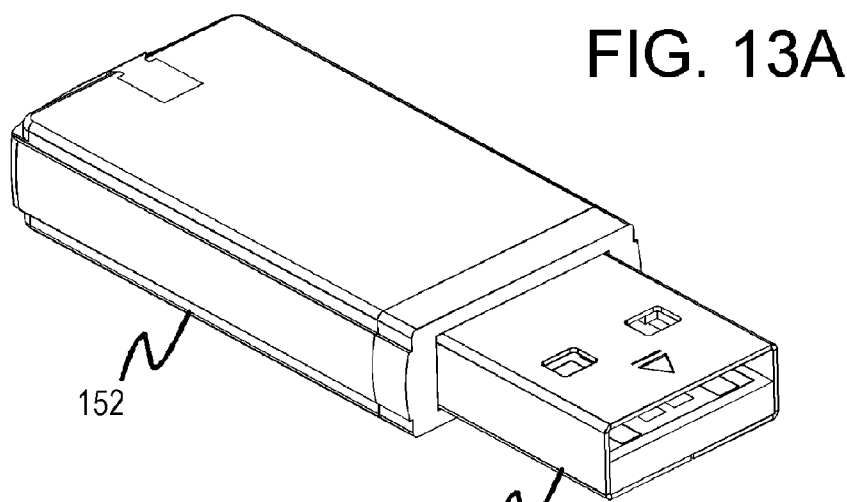
FIGS. 13A-C show an alternative plastic housing.
Figure 13B:
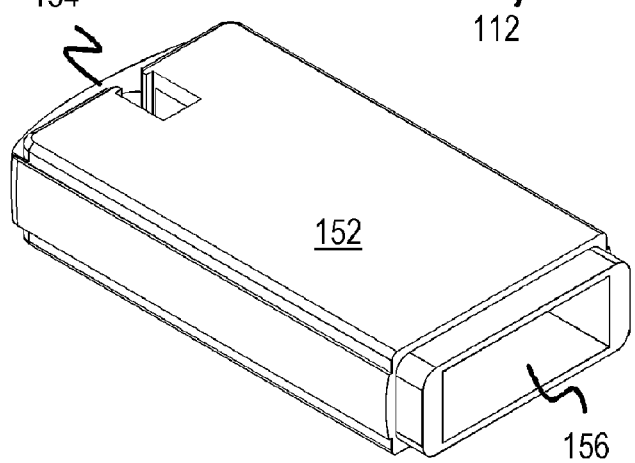
Figure 13C:
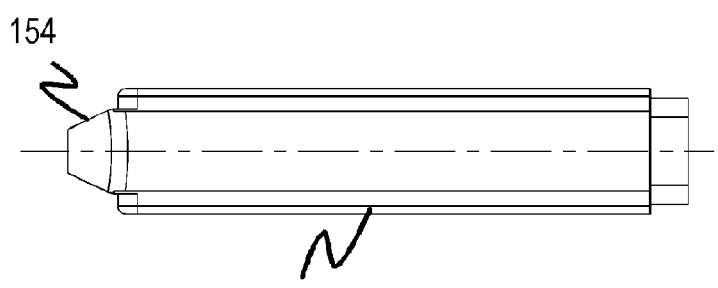

FIGS. 13A-C show an alternative plastic housing. USB connector 112 is mounted to PCB assembly 110 as shown in FIGS. 11A-B. Rather than have separate front and rear housings and a metal tube, a one-piece plastic housing may be substituted as shown in FIG. 13B. FIG. 13C is a cross-sectional view of housing 152.

Housing 152 has light pipe 154 either attached as a separate piece, or integrated into a single molding. PCB assembly 110 is inserted into front opening 156 of housing 152 so that USB connector 112 protrudes out of front opening 156 of the final assembled device shown in FIG. 13A.

The final assembled flash device is symmetric, since PCB assembly 110 is symmetric. Housing 152 does not have to have an off-center front opening, since PCB assembly 110 has USB connector 112 centered over the center-line of the circuit board and of housing 152.

Alternate Embodiments

Several other embodiments are contemplated by the inventors. For example, metal tube 102 may be made from metal such as aluminum, copper alloy, etc., or may be made from plastic (e.g. ABS/PC, nylon, etc). A copper alloy or plastic cap may be used to cover the exposed end of USB connector 112 during transport, such as in a user's pocket or when on a key chain. A 2-piece plastic cap may also be used, or some other cap design. The housing may be of a two-piece design rather than using a single-tube design.

Instead of using simple protrusion snap tabs and grooves, a combination of matching male and female fingers can be substituted. Snap-tabs with movable latching teeth or extensions or locking portions may also be used. Different thicknesses and dimensions can be substituted for the examples given. The USB connector does not have to be exactly centered to be useful, but may be within 10-20% of the center.

USB metal contacts could all have the same length, or the middle contacts could be shorter than the end PCB contacts. Caps for the USB connector plug can be added to embodiments, or can be deleted. Ribs or other features may be added to the housing and other parts to allow for better gripping by the user. Internal ribs could be added for increased strength or shock absorption.

Directional terms such as upper, lower, up, down, top, bottom, etc. are relative and changeable as the device is rotated, flipped over, etc. These terms are useful for describing the device but are not intended to be absolutes. Some embodiments may have chips or other components mounted on only one side of the circuit board, while other embodiments may have components mounted on both sides.

The LED can be mounted on board 140, such as on the bottom side with other components, or can extend from an edge of board 140. A region of reduced thickness may be formed in the housing to create a light window, rather than use a lightpipe. Light from the LED can partially pass through the thinner plastic of a light window, allowing the user to see a visible indicator of activity. A light guide or pipe could also be used to channel the light path to the light window.

Snap tabs can be semi-flexible plastic extensions or protrusion tabs formed on the outer edges of housings and extend outward or inward. Rather than use snap tabs for assembly, raised ridges for ultrasonic bonding may be used, or an adhesive can be used, or some combination. Pressure or heat sensitive adhesive films can be attached to parts where bonding is desired. For example, an adhesive could be brushed on as a liquid or paste, or it could be a double-coated adhesive film such as 3M's 7953 film. A thermal bond film (TBF) such as 3M's TBF-668 could also be used. The adhesive can be cured by heating the assembly, by pressing the covers together, or by allowing sufficient time for curing.

Rather than mount packaged IC's onto one or more sides of board 140, unpackaged die may be mounted using die-bonding techniques. Using unpackaged die rather than packaged die may reduce the size and weight of the card. The edges of board 140 could be straight or could be rounded or have some other shape.

Supporting underside ribs or bumps may be added. Various features can have a variety of shapes and sizes. Oval, round, square, rectangular, trapezoidal, and other shapes may be used.

The USB connector may be widened to accommodate extra metal contacts to become an extended-USB connector for future USB specification. Moreover, the width of the USB connector can be widened, and the height and metal contacts of the slim connector can be varied, making it into a general-purpose slim connector, for USB, extended-USB, PCI Express, mini PCI Express applications, etc.

Other applications besides flash drives include other portable USB devices that connect to desktop computers, notebook computers, PDA's, digital cameras, cellular phones or handsets, TV set-top boxes, MP3, MPEG4, copiers, printers, and other electronic devices. Such devices may use to advantage the reduced wobble of the new USB connectors, and may reduce size and space together with lower cost.

There are 4 pins in the current USB pin out definition— VCC, GND, D+, and D−. VCC is the 5V power pin. GND is the ground pin and D+ and D− are the differential data I/O pins. For the USB 2.0 specification, data transfer rates are up to 480M bits/sec, and the power supply current is 500 mA. These might not meet future (or even some current) needs of speed and power associated with some USB devices, such as large flash memory cards.

Rather than use USB buses, other serial buses may be used such as PCI Express, ExpressCard, Firewire (IEEE 1394), serial ATA, serial attached small-computer system interface (SCSI), etc. For example, when PCI Express is used, additional pins for the PCI Express interface can be added or substituted for the USB differential data pins. PCI express pins include a transmit differential pair PET+, PET−, and a receive differential pair PER+, PER− of data pins. A multi-bus-protocol chip could have an additional personality pin to select which serial-bus interface to use, or could have programmable registers. ExpressCard has both the USB and the PCI Express bus, so either or both buses could be present on an ExpressCard device.

The microcontroller and USB switch components such as the serial engine, DMA, flash-memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

The host can transfer standard USB packets to the serial engine during a transaction, such as a token, data, and handshake packet. Other packet types or variations of these types can be defined for special purposes. These packets may include a flash-controller-request packet, a flash-controller-reply packet, a boot-loader-request packet, a boot-loader-reply packet, a control-program-request packet, a control-program-reply packet, a flash-memory-request packet, and a flash-memory-reply packet. The flash-memory request/reply packets may further include the following request/reply packet pairs: flash ID, read, write, erase, copy-back, reset, page-write, cache-write and read-status.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A Universal-Serial-Bus (USB) device with a centered USB connector comprising:
    a circuit board having a top surface and a bottom surface parallel to the top surface, the circuit board having edges around a perimeter of the top and bottom surfaces, the circuit board having wiring traces;
    an integrated circuit mounted on the top surface or on the bottom surface of the circuit board;
    a USB connector having a metal wrap forming a perimeter of a USB plug;
    USB metal contacts formed on a plug substrate within the USB connector, the USB metal contacts for making physical and electrical contact with metal contacts in a USB socket when the USB plug is inserted into the USB socket;
    wherein the USB connector is mounted to the circuit board so that the USB connector extends to a level above the top surface of the circuit board and the USB connector also extends to a level below the bottom surface of the circuit board;
    wherein the USB connector further comprises a back step, the back step having a step height that is half of a height of the USB connector;
    solder pads on the circuit board, for soldering the USB connector to the circuit board; and
    a housing shaped to surround the circuit board, the housing having a front opening shaped to allow the USB connector to be mounted into the housing during assembly,
    whereby the USB connector extends above and below the circuit board and whereby the USB connector is centered over the circuit board by the back step that is half-height.

2. The USB device with the centered USB connector of claim 1 wherein the USB plug is centered over a center line of the circuit board, the center line of the circuit board being disposed within a plane between the top surface and the bottom surface of the circuit board.

3. The USB device with the centered USB connector of claim 1 further comprising:
    mounting pads on the USB connector, the mounting pads being on the back step of the USB connector,
    wherein the solder pads on the circuit board are soldered to the mounting pads on the USB connector.

4. The USB device with the centered USB connector of claim 3 wherein the mounting pads face downward while the USB metal contacts face upward.

5. The USB device with the centered USB connector of claim 2 wherein the housing is a single molded piece.

6. The USB device with the centered USB connector of claim 2 wherein the housing comprises a front housing and a rear housing, the rear housing connecting to the front housing during assembly.

7. The USB device with the centered USB connector of claim 6 further comprising:
a covering tube disposed over a connecting portion of the front housing and a connecting portion of the rear housing.

8. The USB device with the centered USB connector of claim 7 further comprising:
locking fingers on the rear housing, for locking into locks on the front housing,
wherein the rear housing locks into the front housing during assembly.

9. The USB device with the centered USB connector of claim 8 wherein the locking fingers are formed on sides of the rear housing.

10. The USB device with the centered USB connector of claim 6 further comprising:
a light-emitting diode mounted to the circuit board, for generating an indicator light to signal a user; and
a light pipe, fitting on the rear housing, for passing light from the light-emitting diode to the user through the rear housing.

11. The USB device with the centered USB connector of claim 2 wherein the integrated circuit mounted on the circuit board comprises:
a USB flash microcontroller having a central processing unit (CPU) for executing instructions and a random-access memory (RAM) for storing instructions for execution by the CPU;
a serial engine in the USB flash microcontroller for receiving USB packets from a host over a host USB bus;
wherein the host USB bus includes the USB metal contacts in the USB connector; and
a flash-memory controller in the USB flash microcontroller.

12. The USB device with the centered USB connector of claim 11 wherein the integrated circuit mounted on the circuit board comprises additional flash-memory chips that each comprise:
flash mass storage blocks, coupled to the flash-memory controller, for storing non-volatile data for the host, the data in the flash mass storage blocks being block-addressable and not randomly-addressable; and
a flash bus having parallel data lines for transferring data from the flash-memory controller to the flash mass storage blocks, the flash bus also carrying a command to the flash mass storage blocks over the parallel data lines and also carrying a flash address over the parallel data lines;
wherein a block of data in the flash mass storage blocks is addressable by the flash-memory controller sending the command and a physical address over the parallel data lines, the command and the physical address being used to transfer the block of data over the parallel data lines as a plurality of data words transferred in a plurality of bus cycles;
whereby the flash mass storage blocks that are block-addressable.

13. A portable Universal-Serial-Bus (USB) flash device comprising:

a printed-circuit board assembly (PCBA) having a circuit board with wiring traces, and an integrated circuit mounted to the circuit board;
a USB connector having a USB metal wrap, a substrate, and USB metal contacts formed on the substrate, the USB metal contacts forming a serial-data bus to a host;
a rear step formed on the USB connector, the rear step having a height half of a height of the USB metal wrap;
wherein the rear step of the USB connector is soldered to the circuit board; and
wherein the USB connector is centered over an edge of the circuit board by the rear step;
whereby the USB connector is centered over the edge of the circuit board of the PCBA.

14. The portable USB flash device of claim 13 further comprising:
a housing for holding the PCBA, the housing having a first opening that allows an insertion end of the USB connector to pass through,
wherein the housing comprises:
a front housing having the first opening;
a rear housing having locking fingers that lock the rear housing to the front housing during assembly; and
a tube having a front opening for receiving the front housing, and a rear opening for receiving the rear housing during assembly.

15. The portable USB flash device of claim 13 wherein the integrated circuit comprises:
a serial interface to the serial-data bus that connects to the host;
a serial engine for detecting and processing packets sent over the serial-data bus;
a serial-engine buffer for storing data sent over the serial-data bus;
an internal bus coupled to the serial-engine buffer;
a random-access memory (RAM) for storing instructions for execution, the RAM on the internal bus;
a central processing unit, on the internal bus, the CPU accessing and executing instructions in the RAM;
a flash-memory controller, on the internal bus, for generating flash-control signals and for buffering commands, addresses, and data to a flash bus;
flash mass storage blocks coupled to the flash-memory controller by the flash bus, and controlled by the flash-control signals; and
a direct-memory access (DMA) engine, on the internal bus, for transferring data over the internal bus.

16. A Universal-Serial-Bus (USB) device comprising:
a printed-circuit board assembly (PCBA) having a circuit board with wiring traces formed thereon, and an integrated circuit mounted to the circuit board;
USB metal contact means for making physical and electrical contact with metal contacts in a USB socket when inserted into a USB socket;
USB connector means for inserting into the USB socket, the USB connector means having a USB wrap means for forming a perimeter of a USB plug inserted into the USB socket, and substrate means, within the USB wrap means, for supporting the USB metal contact means within the USB connector means;
half height mounting means, on a rear of the USB connector means while the USB plug is formed on a front of the USB connector means, for mounting the USB connector means to the circuit board wherein the USB connector means extends both above and below levels of surfaces of the circuit board; and housing means for housing the circuit board, the housing means having first opening means for allowing the USB plug of the USB connector means to be mounted into the housing means during assembly;

wherein the housing means comprises:
front housing means for supporting the USB connector means;
rear housing means for connecting to the front housing means to surround the PCBA; and
tube means for encasing a connection of the front housing means to the rear housing means,
whereby the USB connector means is mounted to the circuit board by the half-height mounting means.

17. The USB device of claim 16 further comprising:
engaging means, on the front housing means and on the rear housing means, for coupling the front housing means to the rear housing means during assembly, the engaging means being encased by the tube means.

18. A Universal-Serial-Bus (USB) device with a centered USB connector comprising:
a circuit board having a top surface and a bottom surface parallel to the top surface, the circuit board having edges around a perimeter of the top and bottom surfaces, the circuit board having wiring traces;
an integrated circuit mounted on the top surface or on the bottom surface of the circuit board;
a USB connector having a metal wrap forming a perimeter of a USB plug;
USB metal contacts formed on a plug substrate within the USB connector, the USB metal contacts for making physical and electrical contact with metal contacts in a USB socket when the USB plug is inserted into the USB socket;
wherein the USB connector is mounted to the circuit board so that the USB connector extends to a level above the top surface of the circuit board and the USB connector also extends to a level below the bottom surface of the circuit board;
a housing shaped to surround the circuit board, the housing having a front opening shaped to allow the USB connector to be mounted into the housing during assembly;
wherein the housing comprises a front housing and a rear housing, the rear housing connecting to the front housing during assembly; and
a covering tube disposed over a connecting portion of the front housing and a connecting portion of the rear housing,
wherein the USB plug is centered over a center line of the circuit board, the center line of the circuit board being disposed within a plane between the top surface and the bottom surface of the circuit board,
whereby the USB connector extends above and below the circuit board.

19. The USB device with the centered USB connector of claim 18 wherein the USB connector further comprises a back step, the back step having a step height that is half of a height of the USB connector,
whereby the USB connector is centered over the circuit board by the back step that is half-height.

20. The USB device with the centered USB connector of claim 19 further comprising:
solder pads on the circuit board, for soldering the USB connector to the circuit board.

21. The USB device with the centered USB connector of claim 20 further comprising:
mounting pads on the USB connector, the mounting pads being on the back step of the USB connector,
wherein the solder pads on the circuit board are soldered to the mounting pads on the USB connector.

22. The USB device with the centered USB connector of claim 21 wherein the mounting pads face downward while the USB metal contacts face upward.

23. The USB device with the centered USB connector of claim 18 wherein the housing is a single molded piece.

24. The USB device with the centered USB connector of claim 18 further comprising:
locking fingers on the rear housing, for locking into locks on the front housing,
wherein the rear housing locks into the front housing during assembly.

25. The USB device with the centered USB connector of claim 24 wherein the locking fingers are formed on sides of the rear housing.

26. The USB device with the centered USB connector of claim 18 further comprising:
a light-emitting diode mounted to the circuit board, for generating an indicator light to signal a user; and
a light pipe, fitting on the rear housing, for passing light from the light-emitting diode to the user through the rear housing.

27. The USB device with the centered USB connector of claim 18 wherein the integrated circuit mounted on the circuit board comprises:
a USB flash microcontroller having a central processing unit (CPU) for executing instructions and a random-access memory (RAM) for storing instructions for execution by the CPU;
a serial engine in the USB flash microcontroller for receiving USB packets from a host over a host USB bus;
wherein the host USB bus includes the USB metal contacts in the USB connector; and
a flash-memory controller in the USB flash microcontroller.

28. The USB device with the centered USB connector of claim 27 wherein the integrated circuit mounted on the circuit board comprises additional flash-memory chips that each comprise:
flash mass storage blocks, coupled to the flash-memory controller, for storing non-volatile data for the host, the data in the flash mass storage blocks being block-addressable and not randomly-addressable; and
a flash bus having parallel data lines for transferring data from the flash-memory controller to the flash mass storage blocks, the flash bus also carrying a command to the flash mass storage blocks over the parallel data lines and also carrying a flash address over the parallel data lines;
wherein a block of data in the flash mass storage blocks is addressable by the flash-memory controller sending the command and a physical address over the parallel data lines, the command and the physical address being used to transfer the block of data over the parallel data lines as a plurality of data words transferred in a plurality of bus cycles;
whereby the flash mass storage blocks that are block-addressable.

* * * * *